No. 897,390. PATENTED SEPT. 1, 1908.
LA VERNE W. NOYES.
WINDMILL FRAME.
APPLICATION FILED AUG. 12, 1905.
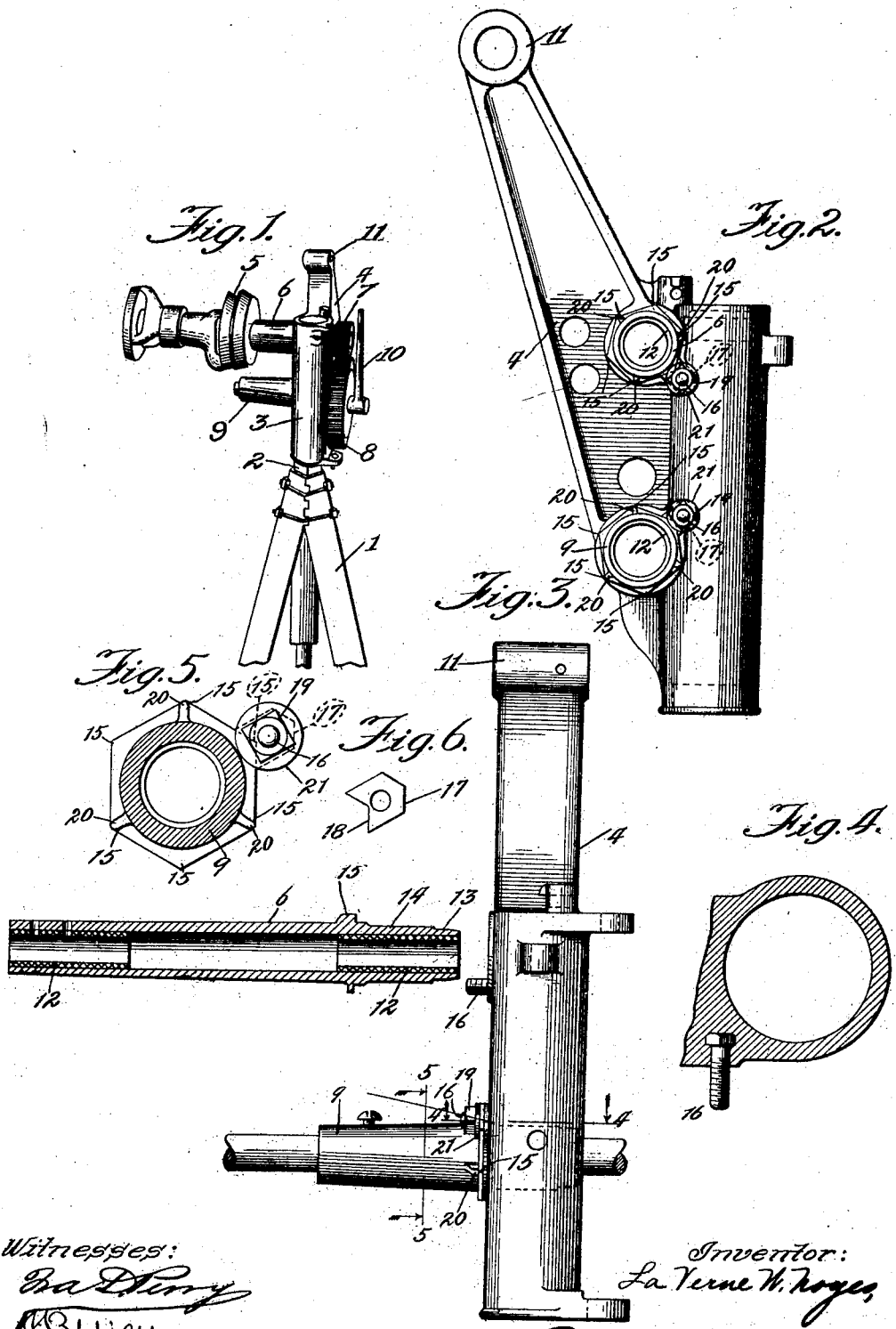

UNITED STATES PATENT OFFICE.

LA VERNE W. NOYES, OF CHICAGO, ILLINOIS.

WINDMILL-FRAME.

No. 897,390.  Specification of Letters Patent.  Patented Sept. 1, 1908.

Application filed August 12, 1905. Serial No. 273,971.

*To all whom it may concern:*

Be it known that I, LA VERNE W. NOYES, a citizen of the United States, residing at Chicago, in the county of Cook and State of Illinois, have invented new and useful Improvements in Windmill-Frames, of which the following is a full, clear, concise, and exact description, reference being had to the accompanying drawing, forming a part of this specification.

My invention relates to improvements in wind mills, my object being to provide improved journal boxes for the operating shafts of the wind wheel, whereby a greater wearing surface is given and whereby the journals may be readily removed for the purpose of repair, etc.

I have illustrated my invention in the accompanying drawings, in which

Figure 1 is a perspective view of the top of my wind mill, showing the general arrangement of the same; Fig. 2 is a side elevation of the support for the operating mechanism of the wind mill; Fig. 3 is an end elevation thereof, showing one of the journals removed and partially in section; Fig. 4 is a partial sectional view taken on the line 4—4 of Fig. 3; Fig. 5 is a sectional view taken on the line 5—5 of Fig. 3; and, Fig. 6 is a detail view of the washer for holding the journals in their correct position.

In the preferred construction of my invention, upon the upper end of the tower 1, is carried a supporting axle 2, having formed thereon a shoulder which forms a bearing surface, upon which the turn table or barrel 3 rests. This barrel carries a bracket or arm 4, upon which the operating mechanism of the wind mill is supported. The hub or spider 5 of the wind wheel is carried on the shaft or axle journaled in a bearing sleeve 6, which is supported from the arm 4. Upon the opposite end of the shaft is carried a pinion 7, which meshes with the gear wheel 8 carried upon a shaft or stud, journaled in the bearing or sleeve 9. The end of the pitman rod 10 is journaled to a crank pin on the wheel 8, which at its opposite end is adapted to be connected with a rod or shaft journaled in the bearing 11 at the upper end of the arm 4. This shaft carries at its opposite end a crank arm to which is secured the upper end of the pump rod.

The sleeves or supports 6 and 9 are of peculiar construction and, instead of being formed integrally with the arm 4, are preferably removably mounted thereon. These supports consist of hollow sleeves, in the ends of which are preferably arranged bearings 12 of Babbitt metal. The inner ends of the sleeves are adapted to fit in openings bored through the arm or bracket 4. Each of these openings is preferably shaped to receive the reduced ends 13 of the sleeves at one end, and the larger portion 14, whereby a rigid and stable support for the sleeves is formed. At an intermediate portion of the end of each sleeve is formed a shoulder 15, which is adapted to rest against the side of the bracket and this shoulder is preferably hexagonal in shape, whereby six corners are formed thereon. Carried by the arm 4 is a projecting screw 16 for each sleeve, this screw being secured in place on the arm 4 in any preferred manner such as by embedding the head thereof in the casting which forms the arm 4. The screw 16 is adapted to receive a washer 17, having formed on one side thereof an angular recess 18, which is adapted to receive one of the angles of the shoulder 15, whereby the journal or bearing is held against movement. A nut 19 is screwed upon the bolt and abuts against a washer 21 placed on the bolt outside the washer 17. The nut 19 and washer 21 serve to hold the washer 17 in position.

In wind mills of the present construction, it has been found that the greatest friction and wear comes upon the journal bearings at certain predetermined points, generally upon the lower side of the outer end and upon the upper side of the inner end, and I have found that by turning the sleeves to a predetermined point, a new wearing surface is provided, avoiding the necessity of substituting new sleeves or substituting new bearings of Babbitt metal. I have also found that in order to get the most advantageous results, the sleeves should be turned one-third of a revolution each time. This presents an entirely new bearing surface, and lateral motion and rattling of the shaft in its bearings is prevented. However, as a wrench is usually the instrument used for turning the sleeves, it would not be advantageous to provide the sleeve with a triangular shoulder, which would require a specially formed wrench. I have, accordingly, on the hexagonal shoulder, formed small ribs 20 at every alternate point, whereby it would be impossible to clamp the washer 21 over the washer 17, and hold the same in position, except at the points where these ribs do not occur. In this manner, I am enabled to provide a shoulder over which the ordinary wrench is adapted to fit and which at the same time will prevent the turning of the sleeve less than one-third of a revolution.

I have shown the shoulder 15 as being formed whereby three turns may be given, as this is the preferable number, and as this gives the proper amount of movement to present an entirely new wearing surface, but it will be understood that any number of points may be formed on the shoulder 15, without departing from the spirit of my invention. It will be understood also that any other means for holding the journals against turning may be provided.

While I have shown the Babbitt journal bearings 12 arranged in the sleeves 6 and 9, it will be distinctly understood that changes may be made, and, if desirable, these Babbitt metal journal bearings may be left out entirely and the sleeves themselves form the journal bearings.

Having thus described my invention what I claim as new and desire to secure by Letters Patent is:

1. In a wind mill, a turn table having a journal-box-receiving opening, a journal-box mounted at one end in said opening, said journal-box being provided with a shoulder, and means, coöperating with said shoulder, for locking the journal-box in various positions whereby the position of the portion of the journal-box most subject to wear may be periodically changed.

2. In a wind mill, the combination with a turn-table having an opening formed therein, of a journal box having an end adapted to fit within said opening, a shoulder upon said journal box, means carried upon the turn-table adapted to engage said shoulder and thereby to retain said box in position, and means for preventing the application of said retaining means except when said journal box is rotated to one of several predetermined positions.

3. In a wind mill, the combination with a turn table, having openings formed therein, of journal boxes provided with journal bearings, said journal boxes having ends thereof adapted to fit within said openings, projections upon said journal boxes, removable means carried upon the turn table adapted to engage one of said projections to prevent the turning of said journal boxes in said openings, and means for preventing the application of said last-named means except when said journal boxes are rotated to a predetermined position.

4. In a wind mill, the combination with a turn table, of an arm or bracket carried thereby, having sockets formed therein, removable supports provided with journal bearings and having the ends thereof adapted to fit within said sockets, shoulders formed upon said supports, pins carried by said arm, and washers carried by said pins having a recess formed therein, into which the points of the shoulders of the supports are adapted to fit.

5. In a wind mill, the combination with a turn table, of removable supports having journal bearings for the wind mill, carried by said turn table, shoulders formed on said supports to receive a wrench to turn the same, means for engaging predetermined points of the shoulder, and means for preventing the engagement of the remaining points of the shoulder.

6. In a wind mill, the combination with a turn table, of a removable support having journal bearings for the wind-wheel shaft and provided with a shoulder, said support having one of its ends adapted to fit into an opening in the turn-table, and means adapted to have screw-threaded connection with said turn-table and normally to clamp the shoulder on said support firmly against the turn-table.

7. In a wind mill, the combination of a turn-table, a bracket secured to said turn-table and provided with an opening, an elongated member carrying bearings for a shaft and having a shoulder formed thereon, said member being adapted to be inserted into said opening and to project from the side of said bracket, and means adapted to clamp over said shoulder and thereby to secure said member to said bracket.

In witness whereof, I have hereunto subscribed my name in the presence of two witnesses.

LA VERNE W. NOYES.

Witnesses:
W. PERRY HALEY,
M. R. ROCHFORD.